(12) United States Patent
Sun et al.

(10) Patent No.: US 12,353,058 B2
(45) Date of Patent: Jul. 8, 2025

(54) OPTICAL LENS ASSEMBLY AND ELECTRICAL DEVICE

(71) Applicant: National Central University, Taoyuan (TW)

(72) Inventors: Wen-Hsin Sun, Taoyuan (TW);
Siang-Siuan Tsai, Taichung (TW);
Jun-Yi Yu, Tainan (TW);
Ching-Cherng Sun, Taoyuan (TW)

(73) Assignee: National Central University, Taoyuan (TW)

( * ) Notice: Subject to any disclaimer, the term of this patent is extended or adjusted under 35 U.S.C. 154(b) by 503 days.

(21) Appl. No.: 18/045,834

(22) Filed: Oct. 12, 2022

(65) Prior Publication Data
US 2024/0036289 A1    Feb. 1, 2024

(30) Foreign Application Priority Data

Jul. 28, 2022    (TW) .................................. 111128300

(51) Int. Cl.
*G02B 9/64*    (2006.01)
(52) U.S. Cl.
CPC ....................................... *G02B 9/64* (2013.01)
(58) Field of Classification Search
CPC ........................................................ G02B 9/64
See application file for complete search history.

(56) References Cited

U.S. PATENT DOCUMENTS

| 10,571,661 B2* | 2/2020 | Huang .................... G02B 3/02 |
| 2012/0056976 A1 | 3/2012 | Lee et al. |
| 2019/0033557 A1* | 1/2019 | Chang ................ G02B 13/0045 |
| 2020/0012078 A1* | 1/2020 | Kuo ....................... G02B 13/18 |

FOREIGN PATENT DOCUMENTS

| CN | 203894464 U | 10/2014 |
| CN | 114089510 A | 2/2022 |
| TW | 201534959 A | 9/2015 |
| TW | 201913165 A | 4/2019 |
| TW | I735653 B | 8/2021 |

* cited by examiner

*Primary Examiner* — Edmond C Lau
(74) *Attorney, Agent, or Firm* — CKC & Partners Co., LLC

(57) ABSTRACT

An optical lens assembly includes a first lens, a second lens, a third lens, a fourth lens, a fifth lens, a sixth lens, a seventh lens and an eighth lens. The first lens has a convex surface toward an object side of the optical lens assembly and a concave surface toward an imaging side of the optical lens assembly. The first lens, the second lens, the third lens, the fourth lens, the fifth lens, the sixth lens, the seventh lens and the eighth lens are sequentially arranged along an optical axis from the object side to the imaging side.

15 Claims, 6 Drawing Sheets

OPTICAL LENS ASSEMBLY AND ELECTRICAL DEVICE

RELATED APPLICATION

This application claims priority to Taiwan Application Serial Number 111128300, filed Jul. 28, 2022, which is herein incorporated by reference in its entirety.

BACKGROUND

Field of Invention

The present disclosure relates to an optical lens assembly and an electronic device with the optical lens assembly.

Description of Related Art

With the development trend of stereoscopic imaging technology, besides the development about large apertures of optical lenses, the optical lenses also need to develop the characteristics of depth-of-field. In addition, with the development of semiconductor technology, the performance of electronic devices has been improved, so that smaller sizes of pixels may be achieved. For example, conventional electronic devices use two optical lenses to obtain images, and the images are overlapped to create a depth-of-field effect. However, the depth-of-field effect of the optical lens may not meet the user's expectation, so an optical lens that meets the requirement of the depth-of-field effect is disclosed.

SUMMARY

An aspect of the present disclosure is related to an optical lens assembly.

According to one embodiment of the present disclosure, an optical lens assembly includes a first lens, a second lens, a third lens, a fourth lens, a fifth lens, a sixth lens, a seventh lens, and an eighth lens. The optical lens assembly has an object side and an imaging side. The first lens has a negative focal length. The first lens has a convex aspheric surface toward the object side and a concave surface toward the imaging side. The second lens has a negative focal length. The third lens has a positive focal length. The fourth lens has a negative focal length. The fifth lens has a positive focal length. The sixth lens has a negative focal length. The seventh lens has a positive focal length. The eighth lens has a negative focal length. The first lens, the second lens, the third lens, the fourth lens, the fifth lens, the sixth lens, the seventh lens and the eighth lens are sequentially arranged from the object side to the imaging side along an optical axis. The following conditions are satisfied: $TL/h<8$; $f/EPD\leq2$; and $1<\Sigma CT/CT8<20$. TL is a distance from the convex aspheric surface of the first lens to an imaging surface on the optical axis, h is a maximum imaging height of the optical lens assembly, f is a focal length of the optical lens assembly, EPD is an entrance pupil diameter of the optical lens assembly, $\Sigma CT$ is a sum of thicknesses of the first lens, the second lens, the third lens, the fourth lens, the fifth lens, the sixth lens, the seventh lens and the eighth lens on the optical axis, and CT8 is a thickness of the eighth lens on the optical axis.

In one embodiment of the present disclosure, the second lens has a concave aspheric surface and a concave surface opposite to the concave aspheric surface. The concave aspheric surface and the concave surface of the second lens face toward the first lens and the third lens, respectively.

In one embodiment of the present disclosure, a distance between the fourth lens and the fifth lens is greater than a distance between the fifth lens and the sixth lens.

In one embodiment of the present disclosure, the seventh lens is bonded to the eighth lens by an adhesive layer.

In one embodiment of the present disclosure, the optical lens assembly further includes an aperture. The aperture is located between the fourth lens and the fifth lens.

In one embodiment of the present disclosure, the aperture is separated from the fourth lens. The aperture is separated from the fifth lens.

In one embodiment of the present disclosure, a distance from the convex aspheric surface of the first lens to the imaging surface on the optical axis is in a range from 12 mm to 19 mm. The following condition is satisfied: 45 degrees<HFOV<65 degrees. HFOV is half of a maximum field of view of the optical lens assembly.

In one embodiment of the present disclosure, a distance between the first lens and the second lens is greater than a distance between adjacent two of the third lens, the fourth lens, the fifth lens, the sixth lens, the seventh lens and the eighth lens.

In one embodiment of the present disclosure, the fourth lens has a convex surface toward the third lens and a concave surface toward the fifth lens. The following condition is satisfied: $(R7+R8)/(R7-R8)>3$. R7 is a curvature radius of the convex surface of the fourth lens. R8 is a curvature radius of the concave surface of the fourth lens.

In one embodiment of the present disclosure, an effective radius of the convex aspheric surface of the first lens toward the object side is less than 6 mm. Abbe coefficients of the fourth lens, the sixth lens and the eighth lens are less than 30.

An aspect of the present disclosure is related to an electronic device.

According to one embodiment of the present disclosure, an electronic device includes a first lens, a second lens, a third lens, a fourth lens, a fifth lens, a sixth lens, a seventh lens, an eighth lens, and a photosensitive element. The electronic device has an object side and an imaging side. The first lens has a negative focal length. The first lens has a convex aspheric surface toward the object side and a concave surface toward the imaging side. The second lens has a negative focal length. The third lens has a positive focal length. The fourth lens has a negative focal length. The fifth lens has a positive focal length. The sixth lens has a negative focal length. The seventh lens has a positive focal length. The eighth lens has a negative focal length. The first lens, the second lens, the third lens, the fourth lens, the fifth lens, the sixth lens, the seventh lens and the eighth lens are sequentially arranged from the object side to the imaging side along an optical axis. The following conditions are satisfied: $TL/h<8$; $f/EPD\leq2$; and $1<\Sigma CT/CT8<20$. TL is a distance from the convex aspheric surface of the first lens to an imaging surface on the optical axis, h is a maximum imaging height of the electronic device, f is a focal length of the electronic device, EPD is an entrance pupil diameter of the electronic device, $\Sigma CT$ is a sum of thicknesses of the first lens, the second lens, the third lens, the fourth lens, the fifth lens, the sixth lens, the seventh lens and the eighth lens on the optical axis, and CT8 is a thickness of the eighth lens on the optical axis. The photosensitive element is disposed at the imaging side of the electronic device. The eighth lens is located between the photosensitive element and the seventh lens.

In one embodiment of the present disclosure, the electronic device further includes a first flat glass. The first flat glass is located between the eighth lens and the imaging surface.

In one embodiment of the present disclosure, the electronic device further includes a second flat glass. The second flat glass is located between the first flat glass and the imaging surface.

In one embodiment of the present disclosure, a distance between the eighth lens and the first flat glass is greater than a distance between the first flat glass and the second flat glass.

In one embodiment of the present disclosure, a distance between the first flat glass and the second flat glass is less than a distance between the second flat glass and the imaging surface.

In the embodiments of the present disclosure, the first lens of the optical lens assembly has the convex surface toward the object side and the concave surface toward the imaging side. The first lens, the second lens, the third lens, the fourth lens, the fifth lens, the sixth lens, the seventh lens, and the eighth lens allow the optical lens assembly to have a specific depth-of-field characteristic without any stepper motor. In addition, the optical lens assembly may also have a fixed focus effect, which may shoot a specific distance. The optical lens assembly may transmit an image to a back-end processor for calculation to obtain a three-dimensional image and its depth information. In this way, additional elements may be reduced to reduce an overall manufacturing cost.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
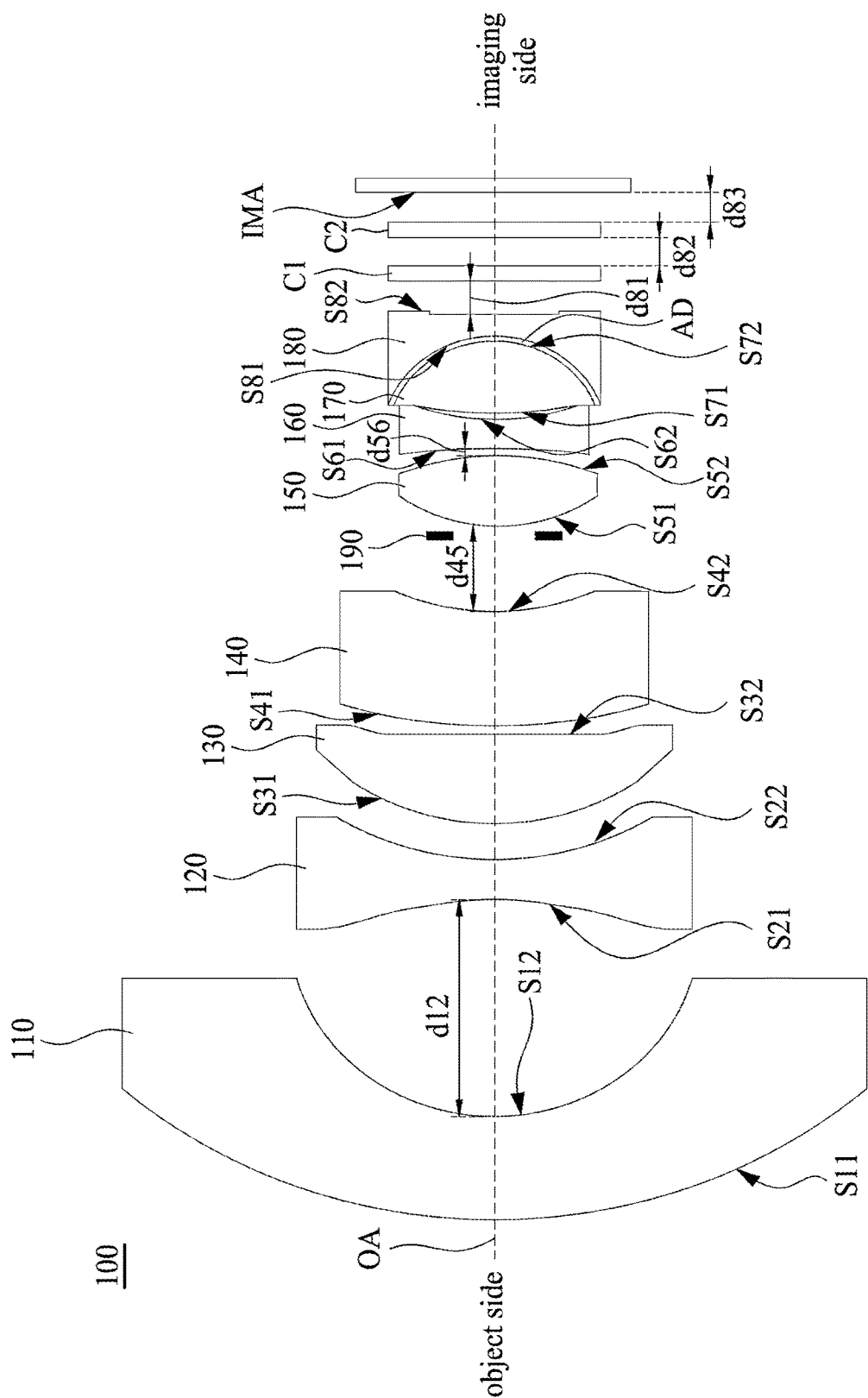
FIG. 1 illustrates a schematic view of an optical lens assembly according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a schematic view of an optical lens assembly 100 according to one embodiment of the present disclosure. The optical lens assembly 100 includes a first lens 110, a second lens 120, a third lens 130, a fourth lens 140, a fifth lens 150, a sixth lens 160, a seventh lens 170 and an eighth lens 180. Two sides of the optical lens assembly 100 are an object side and an imaging side, respectively. The optical lens assembly 100 has an optical axis OA. The first lens 110 has a negative focal length. The first lens 110 has a convex aspheric surface S11 facing toward the object side and a concave surface S12 facing toward the imaging side on the optical axis OA. The second lens 120 has a negative focal length. In some embodiments, the second lens 120 has a concave aspheric surface S21 and a concave surface S22 opposite to the concave aspheric surface S21, and the concave aspheric surface S21 and the concave surface S22 face toward the first lens 110 and the third lens 130, respectively. In addition, the third lens 130 has a positive focal length. The fourth lens 140 has a negative focal length. The fifth lens 150 has a positive focal length. The sixth lens 160 has a negative focal length. The seventh lens 170 has a positive focal length. The eighth lens 180 has a negative focal length. The first lens 110, the second lens 120, the third lens 130, the fourth lens 140, the fifth lens 150, the sixth lens 160, the seventh lens 170, and the eighth lens 180 are sequentially arranged from the object side to the imaging side along the optical axis OA.

In addition, the optical lens assembly 100 satisfies the following conditions: TL/h<8; f/EPD≤2; and 1<ΣCT/CT8<20. TL is a distance from the convex aspheric surface S11 of the first lens 110 to an imaging surface IMA on the optical axis OA, h is a maximum imaging height of the optical lens assembly 100, f is a focal length of the optical lens assembly 100, EPD is an entrance pupil diameter of the optical lens assembly 100, ΣCT is a sum of thicknesses of the first lens 110, the second lens 120, the third lens 130, the fourth lens 140, the fifth lens 150, the sixth lens 160, the seventh lens 170 and the eighth lens 180 on the optical axis OA, and CT8 is a thickness of the eighth lens 180 on the optical axis OA. For example, f may be 1.88 mm, EPD may be 0.94 mm, h may be 2.264 mm, and TL may be 18.53 mm.

In some embodiments, the convex aspheric surface S11 of the first lens 110 toward the object side may be an aspheric surface, and the concave surface S12 of the second lens 120 may be a spherical surface. Aspheric coefficients of the convex aspheric surface S11 of the first lens 110 may be k=12.4303E+00, A4=1.4090E−03, A6=−4.2437E−05, A8=1.0214E−06 and A10=−1.1980E−08. A refractive index of the first lens 110 may be in a range from 1.6 to 1.8, such as 1.755. The first lens 110 may me made of a material that includes glass. A focal length of the first lens 110 may be in a range from −4 mm to −6 mm, such as −5.46 mm. An Abbe coefficient of the first lens 110 may be in a range from 44 to 46, such as 45.7. In addition, a curvature radius of the convex aspheric surface S11 of the first lens 110 may be in a range from 22 mm to 24 mm, such as 23.552 mm, and a curvature radius of the concave surface S12 of the first lens 110 may be in a range from 2 mm to 4 mm, such as 3.4 mm. An effective radius of the convex aspheric surface S11 of the first lens 110 may be less than 6 mm and in a range from 2 mm to 4 mm, such as 3.3 mm, and an effective radius of the concave surface S12 of the first lens 110 may be in a range from 2 mm to 4 mm, such as 3.3 mm. A thickness of the convex aspheric surface S11 of the first lens 110 may be in a range from 1 mm to 2 mm, such as 1.719 mm. A thickness of the concave aspheric surface S12 of the first lens 110 may be in a range from 2 mm to 4 mm, such as 3.99 mm.

Particularly, the first lens 110 of the optical lens assembly 100 has the convex surface S11 toward the object side and the concave surface S12 toward the imaging side. The first lens 110, the second lens 120, the third lens 130, the fourth lens 140, the fifth lens 150, the sixth lens 160, the seventh lens 170, and the eighth lens 180 allow the optical lens assembly 100 to have a specific depth-of-field characteristic without any stepper motor. In addition, the optical lens assembly 100 may also have a fixed focus effect, which may shoot a specific distance. The optical lens assembly 100 may transmit an image to a back-end processor for calculation to obtain a three-dimensional image and its depth information. In this way, additional elements may be reduced to reduce an overall manufacturing cost.

In some embodiments, the optical lens assembly 100 further includes a first flat glass C1 and a second flat glass C2. The first flat glass C1 is located between the eighth lens 180 and the imaging plane IMA. The second plate glass C2 is located between the first plate glass C1 and the imaging plane IMA. That is, the first flat glass C1 is closer to the eighth lens 180 than the second flat glass C2, and the second flat glass C2 is closer to the imaging surface IMA than the first flat glass C1. For example, the first flat glass C1 may be an infrared filter, and the second flat glass C2 may be a protective glass of sensors. A distance d81 between the eighth lens 180 and the first flat glass C1 is greater than a distance d82 between the first flat glass C1 and the second flat glass C2. The distance d82 between the first plate glass C1 and the second plate glass C2 is less than a distance d83 between the second plate glass C2 and the imaging plane IMA. For example, the distance d81 between the eighth lens 180 and the first flat glass C1 may be about 0.5 mm. The distance d82 between the first flat glass C1 and the second flat glass C2 may be about 0.4 mm. The distance d83 between the second flat glass C2 and the imaging plane IMA may be about 0.6 mm.

In some embodiments, a concave aspheric surface S21 of the second lens 120 toward the first lens 110 may be an aspheric surface, and a concave surface S22 toward the third lens 130 may be a spherical surface. Aspheric coefficients of the concave aspheric surface S21 of the second lens 120 may be k=1.0246E+00, A4=2.0393E−03, A6=1.0175E−03, A8=−9.0167E−05, and A10=4.2138E−06. A refractive index of the second lens 120 may be in a range from 1.4 to 1.6, such as 1.548. The second lens 120 may be made of a material that includes glass. A focal length of the second lens 120 may be in a range from −3 mm to −5 mm, such as −4.5 mm. An Abbe coefficient of the second lens 120 may be in a range from 44 to 46, such as 45.9. In addition, a curvature radius of the concave aspheric surface S21 of the second lens 120 may be in a range from −4 mm to −6 mm, such as −5.059 mm, and a curvature radius of the concave surface S22 of the second lens 120 may be in a range from 4 mm to 6 mm, such as 5.059 mm. An effective radius of the concave aspheric surface S21 of the second lens 120 may be in a range from 2 mm to 4 mm, such as 3.005 mm, and an effective radius of the concave surface S22 of the second lens 120 may be in a range from 1 mm to 3 mm, such as 2.662 mm. A thickness of the concave aspheric surface S21 of the second lens 120 may be in a range from 0.5 mm to 1.5 mm, such as 0.721 mm. A thickness of the concave surface S22 of the second lens 120 may be in a range from 0.5 mm to 1.5 mm, such as 0.606 mm.

In some embodiments, a convex surface S31 of the third lens 130 toward the second lens 120 may be a spherical surface, and a convex aspheric surface S32 of the third lens 130 toward the third lens 130 may be an aspherical surface. Aspheric coefficients of the convex aspheric surface S32 of the third lens 130 may be k=−28.9844E+00, A4=6.5860E−03, A6=2.9416E−04, A8=−4.4506E−05, and A10=7.5896E−07. A refractive index of the third lens 130 may be in a range from 1.7 to 1.9, such as 1.806. The third lens 130 may be made of a material that includes glass. A focal length of the third lens 130 may be in a range from 3 mm to 5 mm, such as 4.24 mm. An Abbe coefficient of the third lens 130 may be in a range from 39 to 41, such as 40.9. In addition, a curvature radius of the convex surface S31 of the third lens 130 may be in a range from 2 mm to 4 mm, such as 3.827 mm, and a curvature radius of the convex aspheric surface S32 of the third lens 130 may be in a range from −24 mm to −26 mm, such as −25.616 mm. An effective radius of the convex surface S31 of the third lens 130 may be in a range from 1 mm to 3 mm, such as 2.737 mm, and an effective radius of the convex aspheric surface S32 of the third lens 130 may be in a range from 1 mm to 3 mm, such as 2.496 mm. A thickness of the convex surface S31 of the third lens 130 may be in a range from 1 mm to 2 mm, such as 1.642 mm. A thickness of the convex aspheric surface S32 of the third lens 130 may be in a range from 0.1 mm to 0.2 mm, such as 0.188 mm.

In some embodiments, a convex surface S41 of the fourth lens 140 facing the third lens 130 may be spherical, and a concave surface S42 facing the fifth lens 150 may be aspherical. Aspheric coefficients of the concave surface S42 of the fourth lens 140 may be k=5.7082E+00, A4=−8.7831E−03, A6=2.6482E−04, A8=5.2243E−05, and A10=0.0000E+00. A refractive index of the fourth lens 140 may be in a range from 1.6 to 1.8, such as 1.722. The fourth lens 140 may be made of a material that includes glass. A focal length of the fourth lens 140 may be in a range from −19 mm to −21 mm, such as −20.92 mm. An Abbe coefficient of the fourth lens 140 may be in a range from 28 to 29.9, such as 29.2. In addition, a curvature radius of the convex surface S41 of the fourth lens 140 may be in a range from 8 mm to 10 mm, such as 9.071 mm, and a curvature radius of the concave surface S42 of the fourth lens 140 may be in a range from 4 mm to 6 mm, such as 5.118 mm. An effective radius of the convex surface S41 of the fourth lens 140 may be in a range from 1 mm to 3 mm, such as 2.347 mm, and an effective radius of the concave surface S42 of the fourth lens 140 may be in a range from 1 mm to 2 mm, such as 1.603 mm. A thickness of the convex surface S41 of the fourth lens 140 may be in a range from 1.5 mm to 2.5 mm, such as 2.104 mm. A thickness of the concave surface S42 of the fourth lens 140 may be in a range from 1 mm to 2 mm, such as 1.389 mm.

In some embodiments, a convex aspheric surface S51 of the fifth lens 150 toward the fourth lens 140 may be an aspheric surface, and a convex surface S52 toward the sixth lens 160 may be a spherical surface. Aspheric coefficients of the convex aspheric surface S51 of the fifth lens 150 may be k=−2.3771 E+00, A4=1.3174E−02, A6=4.2048E−04, A8=5.0728E−04, and A10=5.6562E−05. A refractive index of the fifth lens 150 may be in a range from 1.4 to 1.6, such as 1.589. The fifth lens 150 may be made of a material that includes glass. A focal length of the fifth lens 150 may be in a range from 1 mm to 3 mm, such as 2.89 mm. An Abbe coefficient of the fifth lens 150 may be in a range from 60 to 62, such as 61.1. In addition, a curvature radius of the convex aspheric surface S51 of the fifth lens 150 may be in a range from 2 mm to 3 mm, such as 2.521 mm, and a curvature radius of the convex surface S52 of the fifth lens 150 may be in a range from −3 mm to −5 mm, such as −4.219 mm. An effective radius of the convex aspheric surface S51 of the fifth lens 150 may be in a range from 1 mm to 2 mm, such as 1.492 mm, and an effective radius of the convex surface S52 of the fifth lens 150 may be in a range from 1 mm to 2 mm, such as 1.512 mm. A thickness of the convex aspheric surface S51 of the fifth lens 150 may be in a range from 1 mm to 2 mm, such as 1.311 mm. A thickness of the convex surface S52 of the fifth lens 150 may be 0.1 mm.

In some embodiments, a concave surface S61 of the sixth lens 160 toward the fifth lens 150 may be a spherical surface, and a concave aspheric surface S62 toward the seventh lens 170 may be an aspherical surface. Aspheric coefficients of the concave aspheric surface S62 of the sixth lens 160 may be k=3.4140E+00, A4=−1.5656E−02, A6=7.9540E−03, A8=7.8772E−04, and A10=4.6814E−04. A refractive index of the sixth lens 160 may be in a range from 1.6 to 1.8, such as 1.722. The sixth lens 160 may be made of a material that includes glass. A focal length of the sixth lens 160 may be in a range from −3 mm to −5 mm, such as −4.41 mm. An Abbe coefficient of the sixth lens 160 may be in a range from 28 to 29.9, such as 29.2. In addition, a curvature radius of the concave surface S61 of the sixth lens 160 may be in a range from −8 mm to −10 mm, such as −9.814 mm, and a curvature radius of the concave aspheric surface S62 of the sixth lens 160 may be in a range from 3 mm to 5 mm, such as 4.822 mm. An effective radius of the concave surface S61 of the sixth lens 160 may be in a range from 1 mm to 2 mm, such as 1.463 mm, and an effective radius of the concave aspheric surface S62 of the sixth lens 160 may be in a range from 1 mm to 2 mm, such as 1.429 mm. A thickness of the concave surface S61 of the sixth lens 160 may be in a range from 0.1 mm to 1 mm, such as 0.55 mm. A thickness of the concave aspheric surface S62 of the sixth lens 160 may be 0.1 mm.

In some embodiments, a convex aspheric surface S71 of the seventh lens 170 toward the sixth lens 160 may be an aspheric surface. Aspheric coefficients of the convex aspheric surface S71 of the seventh lens 170 may be k=−10.2513E+00, A4=−1.0964E−02, A6=1.9952E−04, A8=2.1280E−03, and A10=−7.4999E−04. A convex surface S72 of the seventh lens 170 is bonded to a concave surface S81 of the eighth lens 180 by an adhesive layer AD. A refractive index of the seventh lens 170 may be in a range from 1.5 to 1.7, such as 1.693. The seventh lens 170 may be made of a material that includes glass. A focal length of the seventh lens 170 may be in a range from 1 mm to 3 mm, such as 2.12 mm. An Abbe coefficient of the seventh lens 170 may be in a range from 52 to 54, such as 53.2. In addition, a curvature radius of the convex aspheric surface S71 of the seventh lens 170 may be in a range from 3 mm to 5 mm, such as 4.288 mm. An effective radius of the convex aspheric surface S71 of the seventh lens 170 may be in a range from 1 mm to 2 mm, such as 1.436 mm. A thickness of the convex aspheric surface S71 of the seventh lens 170 may be in a range from 1 mm to 2 mm, such as 1.416 mm.

In some embodiments, the concave surface S81 of the eighth lens 180 facing the seventh lens 170 may be a spherical surface, and a concave aspheric surface S82 of the eighth lens 180 facing the imaging surface IMA may be an aspheric surface. Aspheric coefficients of the concave aspheric surface S82 of the eighth lens 180 may be k=100.0000E+00, A4=5.6961E−03, A6=−1.3023E−03, A8=1.4031E−04 and A10=4.9378E−05. The concave surface S81 of the eighth lens 180 is bonded to the convex surface S72 of the seventh lens 170 by the adhesive layer AD. A refractive index of the eighth lens 180 may be in a range from 1.6 to 1.8, such as 1.722. The eighth lens 180 may be made of a material that includes glass. A focal length of the eighth lens 180 may be in a range from −1 mm to −3 mm, such as −2.65 mm. An Abbe coefficient of the eighth lens 180 may be in a range from 28 to 29.9, such as 29.2. In addition, a curvature radius of the concave surface S81 of the eighth lens 180 may be in a range from −1.5 mm to −2.5 mm, such as −1.938 mm, and a curvature radius of the concave aspheric surface S82 of the eighth lens 180 may be in a range from 153 mm to 155 mm, such as 154.287 mm. An effective radius of the concave surface S81 of the eighth lens 180 may be in a range from 1 mm to 2 mm, such as 1.492 mm, and an effective radius of the concave aspheric surface S82 of the eighth lens 180 may be in a range from 1 mm to 2 mm, such as 1.635 mm. A thickness of the concave surface S81 of the eighth lens 180 may be in a range from 0.1 mm to 1 mm, such as 0.452 mm, and a thickness of the concave aspheric surface S82 of the eighth lens 180 may be in a range from 1 mm to 3 mm, such as 2.148 mm.

In some embodiments, a distance d12 between the first lens 110 and the second lens 120 is greater than a distance between adjacent two of the third lens 130, the fourth lens 140, the fifth lens 150, the sixth lens 160, the seventh lens 170 and the eighth lens 180. In addition, a distance from the convex aspheric surface S11 of the first lens 110 to the imaging surface IMA on the optical axis OA is in a range from 12 mm to 19 mm. The following condition is satisfied: (R7+R8)/(R7−R8)>3. R7 is a curvature radius of the convex surface S41 of the fourth lens 140, and R8 is a curvature radius of the concave surface S42 of the fourth lens 140.

In addition, the optical lens assembly 100 further includes an aperture 190. The aperture 190 is located between the fourth lens 140 and the fifth lens 150. The aperture 190 is separated from the fourth lens 140, and the aperture 190 is separated from the fifth lens 150. The following condition is satisfied: 45 degrees<HFOV<65 degrees. HFOV is half of a maximum field of view of the optical lens assembly 100. In some embodiments, A focal length of the optical lens assembly 100 may be 1.88 mm, and a full field of view (FOV) of the optical lens assembly 100 may be 100.4 degrees. Effective apertures of the first lens 110, the second lens 120, the third lens 130, the fourth lens 140, the fifth lens 150, the sixth lens 160, the seventh lens 170 and the eighth lens 180 are less than 12 mm, and the optical lens assembly 100 has a depth-of-field effect, and the depth-of-field of the optical lens assembly 100 may be in a range from 167 mm to infinity. In some embodiments, a distance d45 between the fourth lens 140 and the fifth lens 150 is greater than a distance d56 between the fifth lens 150 and the sixth lens 160.

Figure 2:
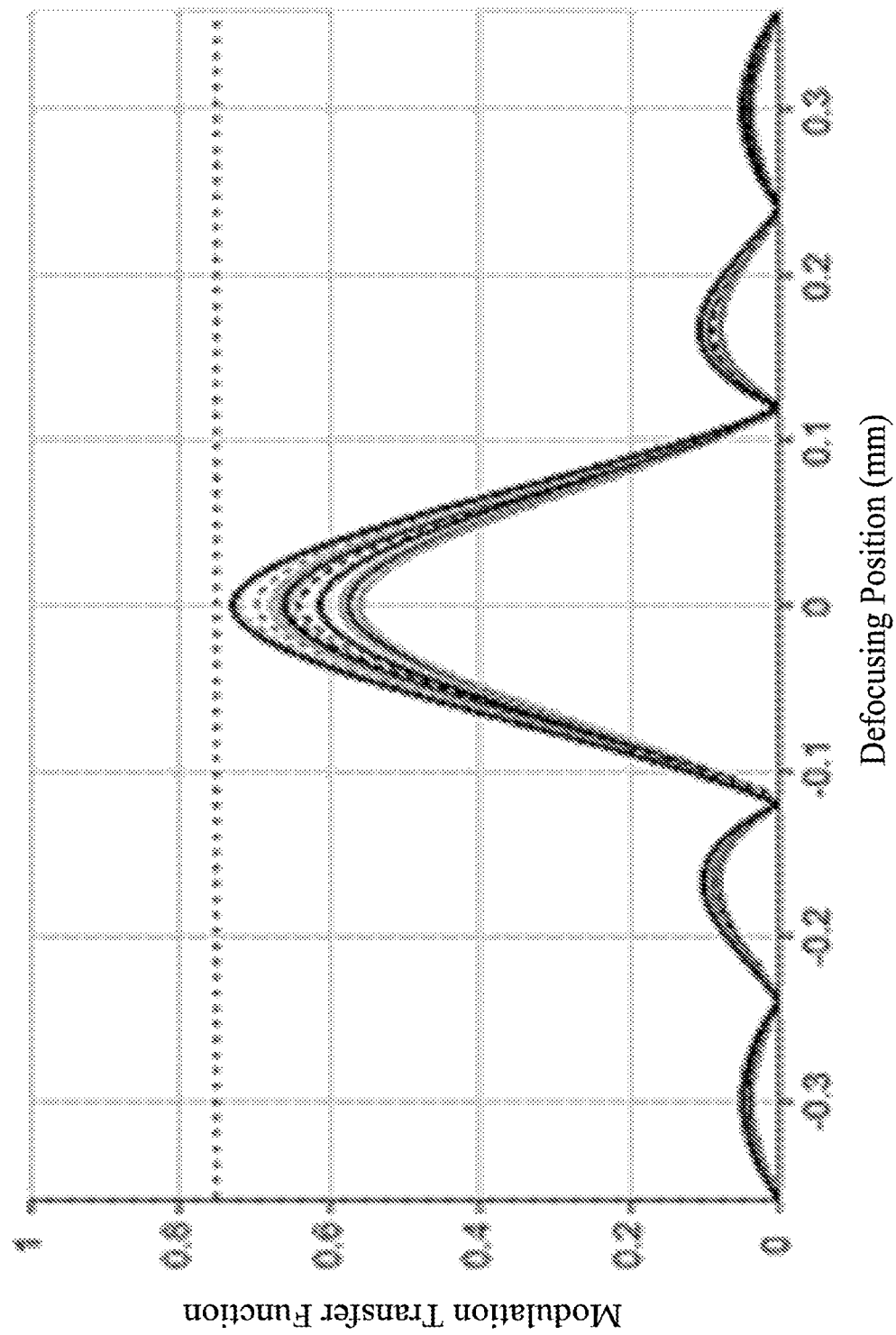
FIG. 2 illustrates a relationship between modulation transfer functions and defocusing positions according to one embodiment of the present disclosure.

FIG. 2 illustrates a relationship between modulation transfer functions and defocusing positions according to one embodiment of the present disclosure. Referring to both FIG. 1 and FIG. 2, a vertical axis of FIG. 2 is the value of the modulation transfer function, and a horizontal axis of FIG. 2 is the value of the defocusing position, such as from −0.3 mm (image shifted to the left) to 0.3 mm (image shifted to the right). When light passes through the optical lens assembly 100, the modulation transfer functions may represent the field of view at different defocusing positions (such as various dotted and solid segments in FIG. 2). The modulation transfer functions are approximately overlapped in the horizontal direction. That is, the design of the optical lens assembly 100 does not cause the defocusing position to shift for various wavelengths in the light. In addition, a maximum value of the modulation transfer function of the optical lens assembly 100 is near to 0.75, and the maximum value does not exceed the diffraction limit (about 0.76) of the horizontal dotted segment. A higher modulation transfer function (MTF) enables the optical lens assembly 100 to have better image clarity.

Figure 3:
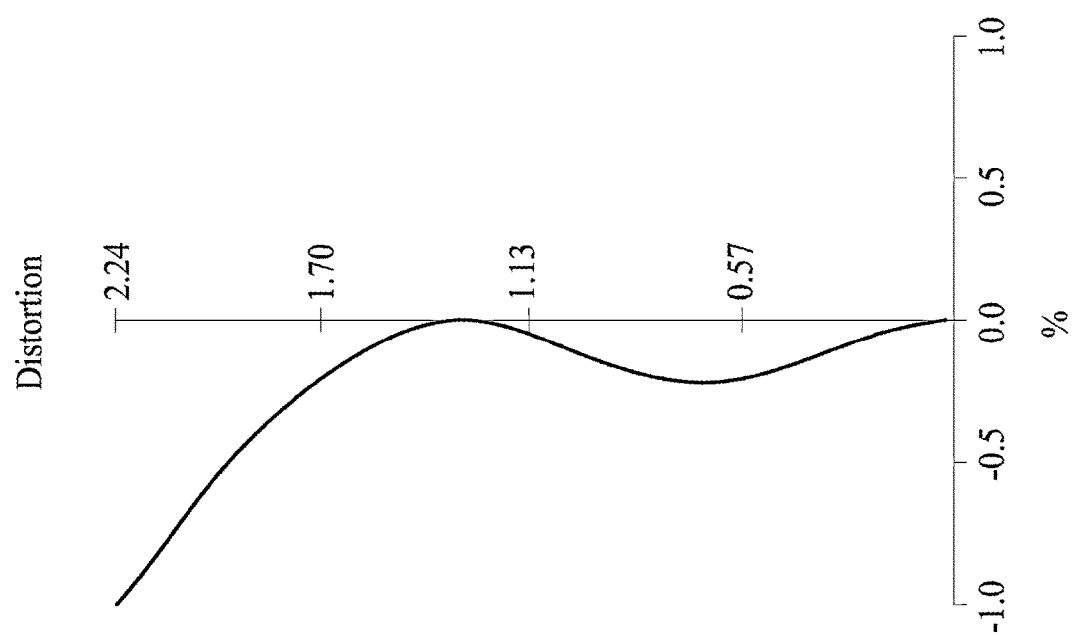
FIG. 3 illustrates an optical distortion of an optical lens assembly according to one embodiment of the present disclosure.

FIG. 3 illustrates an optical distortion of the optical lens assembly 100 (see FIG. 1) according to one embodiment of the present disclosure. Referring to both FIG. 1 and FIG. 3, a vertical axis of FIG. 3 is the value of an imaging height, such as from 0 mm (standard position) to 2.24 mm. A horizontal axis of FIG. 3 is the optical distortion (%), such as from −1% (image shifted to the left) to 1% (image shifted to the right). In addition, the optical distortion of FIG. 3 is a waveform distortion. Compared with the traditional optical lens assembly, the design of the optical lens assembly 100 enables the distortion to be effectively corrected in a range from −1% to 0%, thereby obtaining better optical performance.

Figure 4:
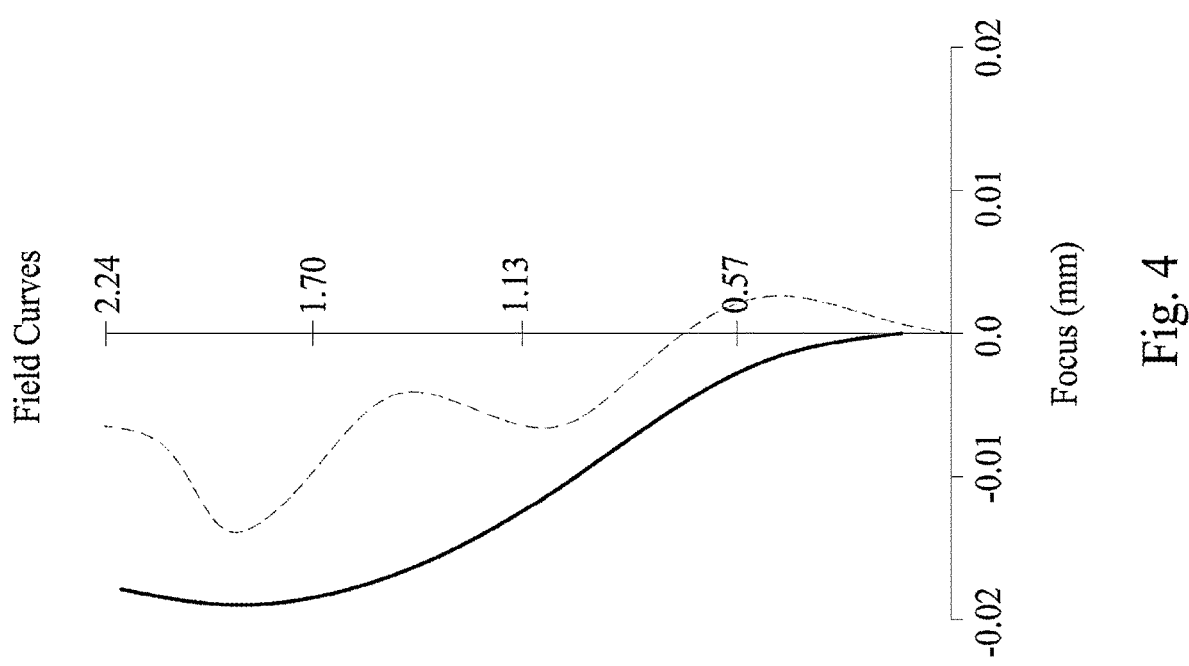
FIG. 4 illustrates field curves of an optical lens assembly according to one embodiment of the present disclosure.

FIG. 4 illustrates field curves of the optical lens assembly 100 (see FIG. 1) according to one embodiment of the present disclosure. Referring to both FIG. 1 and FIG. 4, a vertical axis of FIG. 4 is the value of an imaging height, such as from 0 mm (standard position) to 2.24 mm. A horizontal axis of FIG. 4 is the value of field curve, such as from −0.02 mm (image shifted to the left) to 0.02 mm (image shifted to the right). The solid segment in FIG. 4 may represent the imaging curve of the optical system in the meridional direction, and the dotted segment may represent the imaging curve of the optical system in the sagittal direction. Compared with the traditional optical lens assembly, the design of the optical lens assembly 100 may effectively correct the field curve in a range from −0.02 mm to 0.01 mm, thereby obtaining better optical performance.

Figure 5:
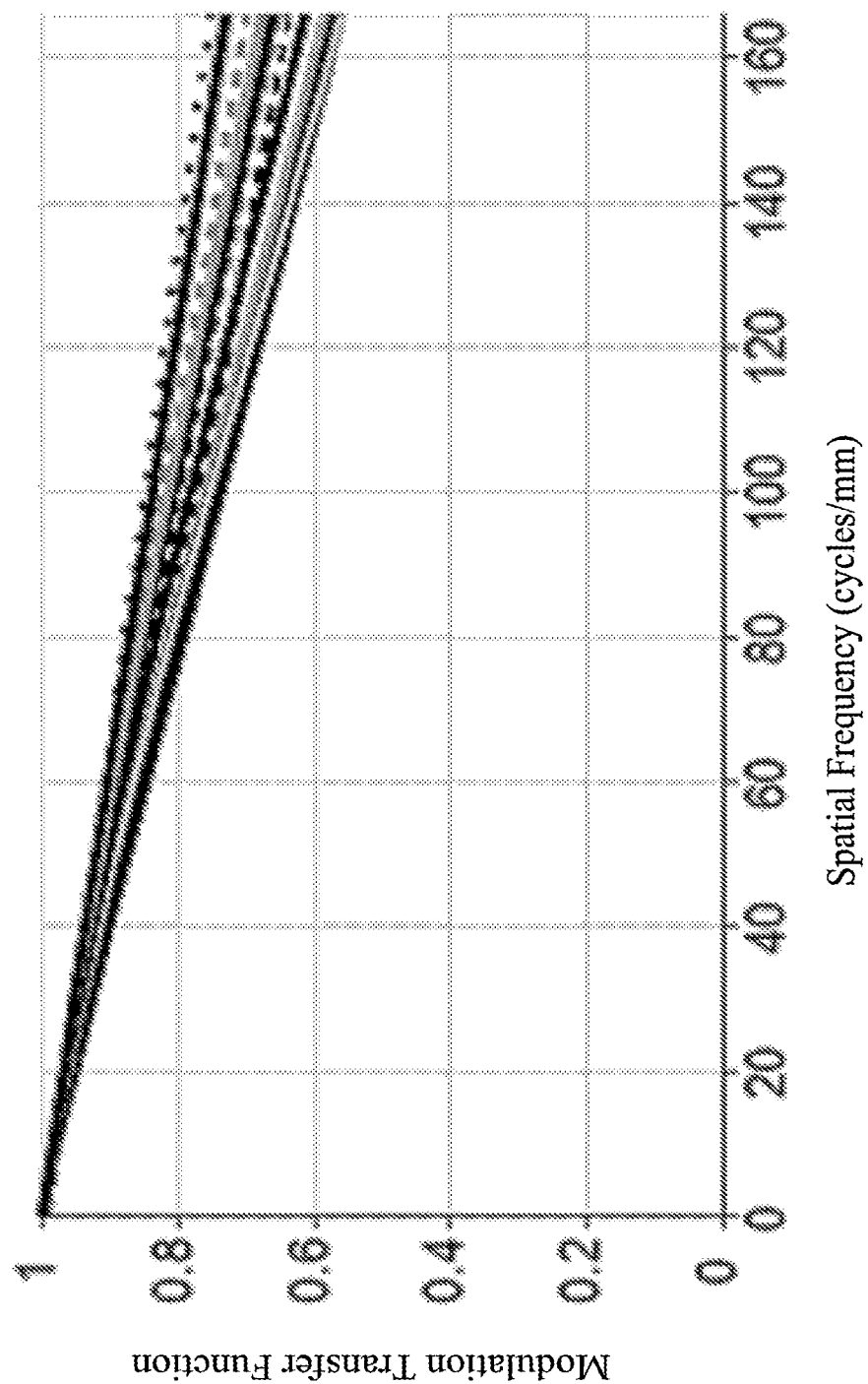
FIG. 5 illustrates a relationship between modulation transfer functions and spatial frequencies according to one embodiment of the present disclosure.

FIG. 5 illustrates a relationship between modulation transfer functions and spatial frequencies according to one embodiment of the present disclosure. Referring to both FIG. 1 and FIG. 5, various segments in FIG. 5 may be modulation transfer functions of light passing through different fields of view of the optical lens assembly 100 at different spatial frequencies. The solid segment may represent the imaging curve of the optical system in the meridional direction. The dotted segment may represent the imaging curve of the optical system in the sagittal direction. Multiple segments may represent modulation transfer functions for different fields of view. When the spatial frequency reaches 160 (cycles/mm), the modulation transfer function of the optical lens assembly 100 is more than 0.4. The design of the optical lens assembly 100 enables the modulation transfer function to be in a range from 0.5 to 0.75, so that the optical lens assembly 100 has better image clarity and better optical performance.

Figure 6:
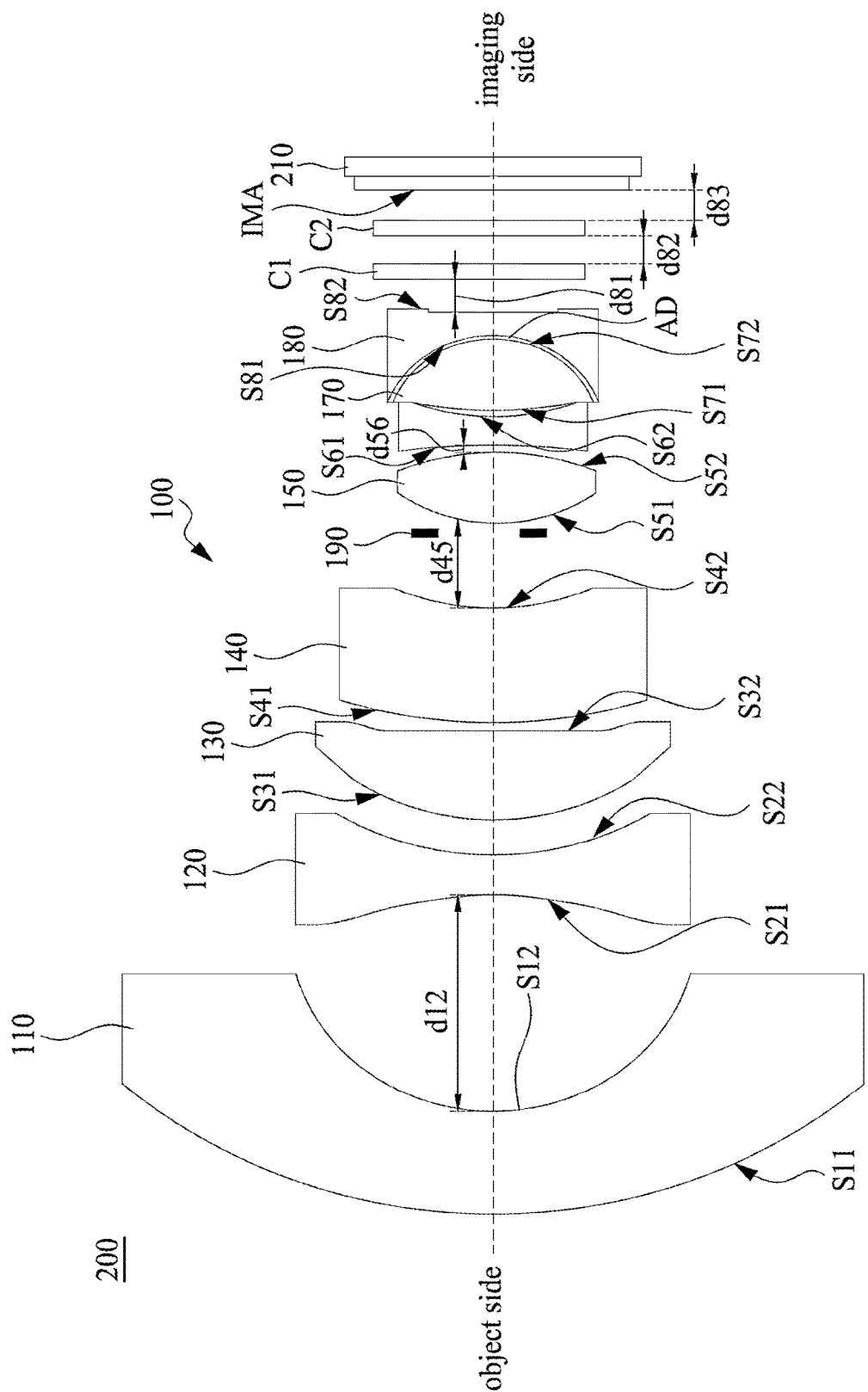
FIG. 6 illustrates a schematic view of an electronic device according to one embodiment of the present disclosure.

FIG. 6 illustrates a schematic view of an electronic device 200 according to one embodiment of the present disclosure. The electronic device 200 includes the optical lens assembly 100 mentioned above and a photosensitive element 210. The photosensitive element 210 is disposed at the imaging side of the optical lens assembly 100. The photosensitive element 210 may sense the image formed on the imaging plane IMA after the light passes through the optical lens assembly 100. The eighth lens 180 is located between the photosensitive element 210 and the seventh lens 170. The first lens 110 of the optical lens assembly 100 has the convex surface S11 toward the object side and the concave surface S12 toward the imaging side. The first lens 110, the second lens 120, the third lens 130, the fourth lens 140, the fifth lens 150, the sixth lens 160, the seventh lens 170, and the eighth lens 180 allow the optical lens assembly 100 to have a specific depth-of-field characteristic without any stepper motor. In addition, the optical lens assembly 100 may also have a fixed focus effect, which may shoot a specific distance. The optical lens assembly 100 may transmit an image to a back-end processor of the electronic device 200 for calculation to obtain a three-dimensional image and its depth information. In this way, additional elements of the electronic device 200 may be reduced to reduce an overall manufacturing cost.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical lens assembly having an object side and an imaging side, the optical lens assembly comprising:
   a first lens having a negative focal length, wherein the first lens has a convex aspheric surface toward the object side and a concave surface toward the imaging side;
   a second lens having a negative focal length;
   a third lens having a positive focal length;
   a fourth lens having a negative focal length;
   a fifth lens having a positive focal length;
   a sixth lens having a negative focal length;
   a seventh lens having a positive focal length; and
   an eighth lens having a negative focal length, wherein the first lens, the second lens, the third lens, the fourth lens, the fifth lens, the sixth lens, the seventh lens and the eighth lens are sequentially arranged from the object side to the imaging side along an optical axis, wherein the following conditions are satisfied:

$TL/h < 8;$ $f/EPD \leq 2;$ and $1 < \Sigma CT/CT8 < 20,$ wherein TL is a distance from the convex aspheric surface of the first lens to an imaging surface on the optical axis, h is a maximum imaging height of the optical lens assembly, f is a focal length of the optical lens assembly, EPD is an entrance pupil diameter of the optical lens assembly, ΣCT is a sum of thicknesses of the first lens, the second lens, the third lens, the fourth lens, the fifth lens, the sixth lens, the seventh lens and the eighth lens on the optical axis, and CT8 is a thickness of the eighth lens on the optical axis.

2. The optical lens assembly of claim 1, wherein the second lens has a concave aspheric surface and a concave surface opposite to the concave aspheric surface, and the concave aspheric surface and the concave surface of the second lens face toward the first lens and the third lens, respectively.

3. The optical lens assembly of claim 1, wherein a distance between the fourth lens and the fifth lens is greater than a distance between the fifth lens and the sixth lens.

4. The optical lens assembly of claim 1, wherein the seventh lens is bonded to the eighth lens by an adhesive layer.

5. The optical lens assembly of claim 1, further comprising:
an aperture located between the fourth lens and the fifth lens.

6. The optical lens assembly of claim 5, wherein the aperture is separated from the fourth lens, and the aperture is separated from the fifth lens.

7. The optical lens assembly of claim 1, wherein a distance from the convex aspheric surface of the first lens to the imaging surface on the optical axis is in a range from 12 mm to 19 mm, and the following condition is satisfied:

45 degrees<HFOV<65 degrees, wherein HFOV is half of a maximum field of view of the optical lens assembly.

8. The optical lens assembly of claim 1, wherein a distance between the first lens and the second lens is greater than a distance between adjacent two of the third lens, the fourth lens, the fifth lens, the sixth lens, the seventh lens and the eighth lens.

9. The optical lens assembly of claim 1, wherein the fourth lens has a convex surface toward the third lens and a concave surface toward the fifth lens, and the following condition is satisfied:

$(R7+R8)/(R7-R8)>3$, wherein R7 is a curvature radius of the convex surface of the fourth lens, and R8 is a curvature radius of the concave surface of the fourth lens.

10. The optical lens assembly of claim 1, wherein an effective radius of the convex aspheric surface of the first lens toward the object side is less than 6 mm, and Abbe coefficients of the fourth lens, the sixth lens and the eighth lens are less than 30.

11. An electronic device having an object side and an imaging side, the electronic device comprising:

a first lens having a negative focal length, wherein the first lens has a convex aspheric surface toward the object side and a concave surface toward the imaging side,
a second lens having a negative focal length;
a third lens having a positive focal length;
a fourth lens having a negative focal length;
a fifth lens having a positive focal length;
a sixth lens having a negative focal length;
a seventh lens having a positive focal length; and
an eighth lens having a negative focal length, wherein the first lens, the second lens, the third lens, the fourth lens, the fifth lens, the sixth lens, the seventh lens and the eighth lens are sequentially arranged from the object side to the imaging side along an optical axis, wherein the following conditions are satisfied:

$TL/h<8$;

$f/EPD \leq 2$; and $1 < \Sigma CT/CT8 < 20$, wherein TL is a distance from the convex aspheric surface of the first lens to an imaging surface on the optical axis, h is a maximum imaging height of the electronic device, f is a focal length of the electronic device, EPD is an entrance pupil diameter of the electronic device, $\Sigma CT$ is a sum of thicknesses of the first lens, the second lens, the third lens, the fourth lens, the fifth lens, the sixth lens, the seventh lens and the eighth lens on the optical axis, and CT8 is a thickness of the eighth lens on the optical axis; and
a photosensitive element disposed at the imaging side of the electronic device, wherein the eighth lens is located between the photosensitive element and the seventh lens.

12. The electronic device of claim 11, further comprising:
a first flat glass located between the eighth lens and the imaging surface.

13. The electronic device of claim 12, further comprising:
a second flat glass located between the first flat glass and the imaging surface.

14. The electronic device of claim 13, wherein a distance between the eighth lens and the first flat glass is greater than a distance between the first flat glass and the second flat glass.

15. The electronic device of claim 13, wherein a distance between the first flat glass and the second flat glass is less than a distance between the second flat glass and the imaging surface.

* * * * *